United States Patent [19]

Koyanagi et al.

[11] Patent Number: 4,527,531
[45] Date of Patent: Jul. 9, 1985

[54] METHOD OF DETECTING FUEL INJECTION TIMING

[75] Inventors: Yuzo Koyanagi, Warabi; Tetuo Koike, Hachioji; Takayuki Suzuki, Tokorozawa; Tadakazu Shiozaki, Hachioji, all of Japan

[73] Assignee: Sanwa Seiki Mfg., Co. Ltd., Yono, Japan

[21] Appl. No.: 346,644

[22] Filed: Feb. 8, 1982

[51] Int. Cl.³ .......................................... F02M 39/00
[52] U.S. Cl. ................................. 123/501; 123/357; 123/494; 73/119 A
[58] Field of Search ............... 123/501, 500, 357, 494, 123/419, 436; 73/116, 119 A

[56] References Cited

U.S. PATENT DOCUMENTS

| | | | |
|---|---|---|---|
| 4,141,242 | 2/1979 | Scott | 73/119 A |
| 4,158,305 | 6/1979 | Shipley | 73/119 A |
| 4,188,920 | 2/1980 | Bianchi | 123/436 |
| 4,258,324 | 3/1981 | Henrich | 73/119 A |
| 4,275,692 | 6/1981 | Takeda | 123/419 |
| 4,357,662 | 11/1982 | Shira | 123/419 |
| 4,369,651 | 1/1983 | Szentes | 73/119 A |
| 4,375,668 | 3/1983 | Leung | 123/419 |
| 4,380,800 | 4/1983 | Wilfinson | 123/419 |
| 4,388,907 | 6/1983 | Sugo | 123/494 |

Primary Examiner—Carl Stuart Miller
Attorney, Agent, or Firm—Bert J. Lewen; Henry Sternberg

[57] ABSTRACT

A method of detecting the timing of fuel injection in a diesel engine for the regulation of the timing of fuel injection by a fuel injection timing regulator is disclosed. Rotation angle indicating lugs are provided on the crankshaft of the engine connected to the input shaft of the fuel injection timing regulator and on the output shaft of the fuel injection timing regulator to measure the time difference between pulses corresponding to the lugs on the input and output shafts making relative rotation, and a reference rotation angle indicating lug is provided adjacent to each of the lugs provided on one of the input and output shafts to measure the reference timing difference between pulses corresponding to the lugs on the shaft under rotation. The phase angle of the output shaft relative to the input shaft can be accurately calculated on the basis of the former and latter time differences.

8 Claims, 4 Drawing Figures

METHOD OF DETECTING FUEL INJECTION TIMING

BACKGROUND OF THE INVENTION

This invention relates to a fuel injection timing regulator for an engine, and more particularly to a method of detecting the fuel injection timing regulated by such a regulator.

The timing of injection of fuel into the cylinders of an internal combustion engine such as a diesel engine is controlled to be maintained optimum on the basis of the factors including the engine rotation speed and load torque.

For the purpose of optimized control of the fuel injection timing, a fuel injection timing regulator is interposed between a fuel injection pump and the engine driving the fuel injection pump, and the phase angle of the drive shaft of the fuel injection pump under rotation relative to the drive shaft of the engine is properly determined by the function of the fuel injection timing regulator. In a method commonly used hitherto for the purpose of optimized control of the fuel injection timing, a signal indicative of the relative rotation phase angle of the pump drive shaft is fed back for the automatic control of a closed loop circuit. For the purpose of detection of the relative rotation phase angle, a plurality of first rotation angle indicating lugs are fixedly mounted on the circumference, in the direction of rotation, of the engine drive shaft at angular positions corresponding to the upper dead points of the pistons in the respective cylinders of the engine to be sensed by a stationary sensor such as a first electromagnetic pickup disposed at a fixed point, and the length of time required until one of the rotation angle indicating lugs is sensed by the electromagnetic pickup after the preceding one has been sensed by the electromagnetic pickup is measured to provide a reference time. On the other hand, a plurality of second rotation angle indicating lugs corresponding to the first rotation angle indicating lugs are similarly fixedly mounted on the drive shaft of the fuel injection pump to be sensed by another stationary sensor such as a second electromagnetic pickup disposed at another fixed point. The prior art method comprises measuring the difference between the time at which one of the first rotation angle indicating lugs mounted on the drive shaft of the engine is sensed by the first electromagnetic pickup and the time at which the corresponding one of the second rotation angle indicating lugs mounted on the drive shaft of the fuel injection pump is sensed by the second electromagnetic pickup, and calculating the relative rotation phase angle of the pump drive shaft on the basis of the measured time difference above described and the measured reference time representing the length of time required for the engine drive shaft to rotate through the known rotation angle between the angular positions corresponding to the upper dead points.

According to the above method, the relative rotation phase angle of the pump drive shaft can be accurately calculated when the angular velocity of the engine drive shaft does not vary and is maintained constant throughout the period of measurement of the reference time and the period of measurement of the time difference.

However, according to the results of researches and studies made by the inventors, the above condition is not satisfied during the period of warming-up in the starting stage of the engine and during the subsequent initial driving stage, and the engine drive shaft tends to rotate with considerable non-uniformity between one fuel injection timing and the next. Consequently, a large error tends to be included in the calculated value of the relative rotation phase angle of the drive shaft of the fuel injection pump.

SUMMARY OF THE INVENTION

It is a primary object of the present invention to provide a novel and improved method of fuel injection timing detection which obviates the problem of the error pointed out above.

The method of fuel injection timing detection according to the present invention is featured by the fact that rotation angle indicating means are provided in the drive systems driving the input shaft and output shaft respectively of the fuel injection timing regulator to measure the time difference between pulses indicative of the rotation angles of the input and output shafts under rotation relative to each other, and reference rotation angle indicating means is provided adjacent to each of the rotation angle indicating means provided in the drive system for one of the shafts to measure the reference time difference between pulses indicative of rotation of that shaft. The phase angle of one of the shafts relative to the other is calculated on the basis of the former and latter time differences. Thus, the relative rotation phase angle can be accurately calculated according to the method of the present invention.

DESCRIPTION OF THE PREFERRED EMBODIMENTS

Preferred embodiments of the method of the present invention will now be described in detail with reference to the drawings.

Figure 1:
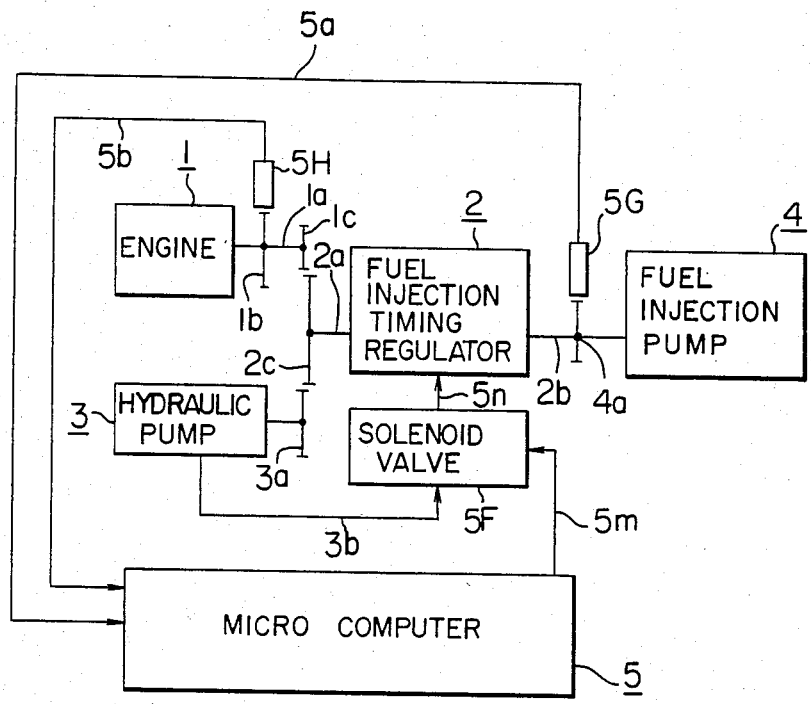
FIG. 1 is a block diagram of a fuel injection timing control system controlling the fuel injection timing by an embodiment of the method of fuel injection timing detection according to the present invention.
Figure 2:
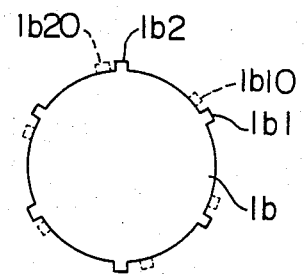
FIG. 2 is a front elevation view of the disc 1b shown in FIG. 1.

FIG. 1 is a block diagram of a fuel injection timing control system controlling the fuel injection timing by an embodiment of the method of fuel injection timing detection according to the present invention, and FIG. 2 is a front elevation view showing the structure of the disc 1b shown in FIG. 1.

Referring to FIG. 1, a gear 1c fixedly mounted on the crankshaft 1a of a diesel engine 1 makes meshing engagement with a gear 2c fixedly mounted on an input shaft 2a of a fuel injection timing regulator 2. An output shaft 2b of the fuel injection timing regulator 2 drives a fuel injection pump 4. The fuel injection timing regulator 2 functions to change the phase angle of the output shaft 2b relative to the input shaft 2a depending on the operating condition of the diesel engine 1, thereby properly setting the timing of fuel injection by the fuel injection pump 4. This fuel injection timing regulator 2 is of the known structure.

A hydraulic pump unit 3 is driven by a gear 3a which is in meshing engagement with the gear 2c, and this hydraulic pump unit 3 supplies hydraulic fluid at a regulated pressure to a solenoid-operated valve 5F by way of a piping 3b.

A disc 1b is fixedly mounted on the crankshaft 1a of the diesel engine 1 for the purpose of measurement of the rotation angle and rotation speed of the crankshaft 1a of the diesel engine 1. A disc 4a similar to the disc 1b is also fixedly mounted on the output shaft 2b of the fuel injection timing regulator 2. On the circumference of each of these discs 1b and 4a, a plurality of lugs are provided at equally circumferentially spaced positions. Two lug-passage sensors, which may be electromagnetic pickups 5H and 5G, are fixedly disposed opposite to the circumference of the discs 1b and 4a respectively for sensing the lugs passing the positions opposite thereto with the rotation of the discs 1b and 4a. The electromagnetic pickups 5H and 5G are electrically connected to a microcomputer 5 by signal conductors 5b and 5a respectively.

Referring to FIG. 2, the lugs provided on the circumference of the disc 1b fixedly mounted on the crankshaft 1b of the diesel engine 1 include lugs $1b_1$, $1b_2$,—disposed at positions corresponding respectively to the upper dead points of the pistons in the individual cylinders of the diesel engine 1 in one engine cycle so that the lugs $1b_1$, $1b_2$,—pass successively the position opposite to the electromagnetic pickup 5H at the upper dead points of the pistons in the individual cylinders of the diesel engine 1. Additional lugs $1b_{10}$, $1b_{20}$,—shown by the imaginary lines in FIG. 2 are provided adjacent to the respective lugs $1b_1$, $1b_2$,—provided on the circumference of the disc 1b so as to function as a reference time difference indicator. The structure of the disc 1b differs from the prior art structure in that such lugs $1b_{10}$, $1b_{20}$,—are additionally provided on the circumference of the disc 1b.

The operation of the fuel injection timing control system having the above construction will now be described.

The diesel engine 1 is driven by actuation of the accelerator pedal (not shown), and the fuel injection pump 4 is driven from the crankshaft 1a through the gears 1c and 2c, input shaft 2a, fuel injection timing regulator 2 and output shaft 2b. The fuel injection timing regulator 2 is controlled on the basis of the factors including the rotation speed of the diesel engine 1, the displacement of the accelerator pedal, the temperature of cooling water in the water jacket (which temperature will be referred to hereinafter merely as a water temperature) and the condition of ambient air, and functions to change the phase angle of the output shaft 2b relative to the input shaft 2a (hence, the crankshaft 1a), thereby properly setting the timing of fuel injection by the fuel injection pump 4.

For the determination of the optimum timing of fuel injection, the microcomputer 5 applies an instruction output signal to the solenoid-operated valve 5F by way of a signal conductor 5m for the on-off control of the solenoid-operated valve 5F, and an amplified hydraulic fluid signal is supplied from the solenoid-operated valve 5F to the fuel injection timing regulator 2 by way of a signal conductor 5n to actuate the regulator.

Figure 3:
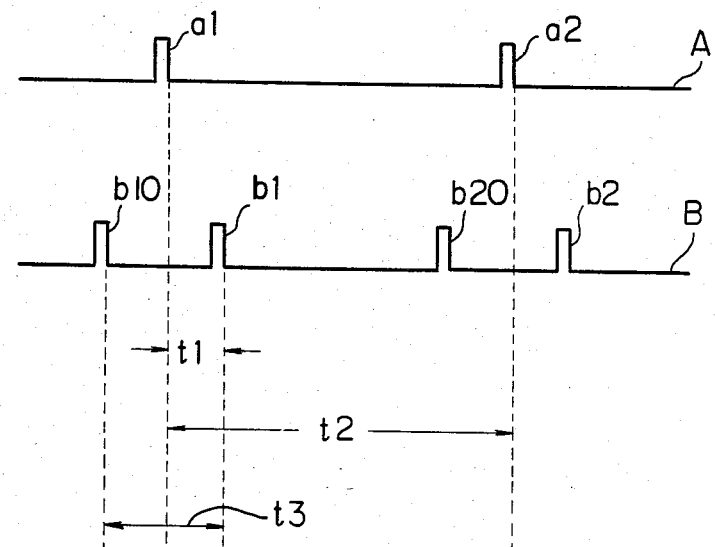
FIG. 3 shows pulse trains A and B appearing from the electromagnetic pickups 5G and 5H shown in FIG. 1 respectively.

With the rotation of the disc 1b, the lugs $1b_1$,—provided on the circumference of the disc 1b pass successively the position opposite to the electromagnetic pickup 5H to be sensed by the electromagnetic pickup 5H, and a pulse signal B as shown in FIG. 3 is applied from the electromagnetic pickup 5H to the microcomputer 5.

Pulses $b_1$ and $b_2$ in the pulse signal B shown in FIG. 3 indicate that the lugs $1b_1$ and $1b_2$ shown in FIG. 2 have passed the position opposite to the electromagnetic pickup 5H respectively. Pulses $b_{10}$ and $b_{20}$ shown in FIG. 3 indicate that the lugs $1b_{10}$ and $1b_{20}$ shown in FIG. 2 have passed the position opposite to the electromagnetic pickup 5H respectively.

Similarly, pulses $a_1$ and $a_2$ in a pulse signal A shown in FIG. 3 indicate that the corresponding lugs provided on the circumference of the disk 4a have passed the position opposite to the electromagnetic pickup 5G respectively. The positions of such pulses $a_1$, $a_2$—coincide with the timing of successive injection of fuel into the individual cylinders of the diesel engine 1 by the fuel injection pump 4.

The positions of the pulses $b_1$, $b_2$,—coincide with the angular positions of rotation of the crankshaft 1a corresponding to the upper dead points of the pistons in the individual cylinders respectively. Therefore, the time difference $t_1$ between the pulses $a_1$ and $b_1$ has a value proportional to the phase angle of the output shaft 2b of the fuel injection timing regulator 2 relative to the predetermined rotation angle of the crankshaft 1a until fuel is injected by the fuel injection pump 4. The phase angle of the output shaft 2b relative to the rotation angle of the crankshaft 1a is changed under control of the microcomputer 5 which controls the fuel injection timing regulator 2. The time difference $t_1$ shown in FIG. 3 is changeable practically within the extent of the range $t_3$ under control of the microcomputer 5, and the position of the pulse $b_{10}$ in FIG. 3 corresponds to a predetermined angular position of rotation of the crankshaft 1a to define the range $t_3$ together with the pulse $b_1$.

Before describing the manner of calculating the relative rotation phase angle of the output shaft 2b of the fuel injection timing regulator 2 in the method of the present invention, the prior art manner of calculation will be described for the sake of reference so that the present invention can be better understood.

The rotation angle defined between the pulses $a_1$ and $a_2$ sensed by the electromagnetic pickup 5G is already known from the relation between the corresponding lugs provided on the circumference of the disc 4a. If there is no change in the angular velocity of the output shaft 2b during rotation through this angle, the length of time $t_2$ measured between the pulses $a_1$ and $a_2$ can be used as a reference time difference proportional to the known rotation angle of the output shaft 2b. Similarly, unless a change occurs in the angular velocity of the output shaft 2b under rotation, the time difference $t_1$ between the pulses $a_1$ and $b_1$ has a value proportional to the relative rotation phase angle $P\theta$ of the output shaft 2b in the same proportion as the proportion above described. In such a case, therefore, the relative rotation phase angle $P\theta$ of the output shaft 2b is expressed as $$P\theta = C_1 \times t_1/t_2 \tag{1}$$

where $C_1$ is a constant determined by the angular distance between the lugs on the disc 4a providing the pulses $a_1$ and $a_2$ shown in FIG. 3.

Figure 4:
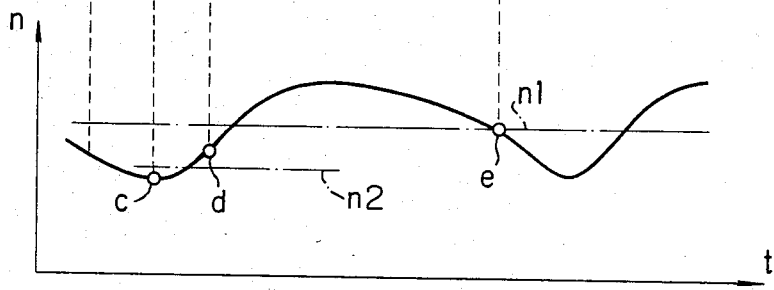
FIG. 4 shows the characteristic curve of the angular velocity n of the crankshaft 1a shown in FIG. 1.

However, in the initial period of the starting stage of the diesel engine 1, the engine 1 is not sufficiently warmed up, and the angular velocity n of the crankshaft 1a (or the output shaft 2b) under rotation varies considerably as shown in FIG. 4.

More precisely, at time c at which the pulse $a_1$ indicating the timing of fuel injection appears, the angular velocity n has its minimum value as seen in FIG. 4. Subsequently, the angular velocity n increases as a result of ignition of fuel and then decreases toward time e which indicates the next timing of fuel injection. Since thus the degree of fuel ignition is not uniform in the starting stage of the diesel engine 1, the angular velocity n does not make a uniform periodic change between the first timing of fuel injection and the second timing of fuel injection.

In the above-described operating condition of the diesel engine 1, the period of time between the time c and the time e is measured to find the reference time difference $t_2$ in FIG. 3. This corresponds to the measurement of the reference time difference $t_2$ at the mean angular velocity $n_1$ shown by the one-dot chain line in FIG. 4. On the other hand, the period of time between the time c and the time d is measured to find the time difference $t_1$. The mean angular velocity in this case is $n_2$ as shown by another one-dot chain line in FIG. 4. This means that the reference time difference $t_2$ and the time difference $t_1$ are measured at different angular velocities respectively. Therefore, the relative rotation phase angle $P\theta$ calculated according to the equation (1) using such values of $t_1$ and $t_2$ includes inevitably a large error.

According to the present invention which obviates the inclusion of a large error in the prior art manner of calculation, the time difference $t_3$ between the pulses $b_{10}$ and $b_1$ spaced apart by the predetermined angular distance is employed as the reference time difference, and the relative rotation phase angle $P\theta$ is calculated according to the following equation (2):

$$P\theta = C_2 \times t_1 / t_3 \quad (2)$$

where $C_2$ is a constant determined by the angular distance between the lugs $1b_1$ and $1b_{10}$ provided on the disc $1b$.

It is thus the basic idea of the present invention that reference pulses $b_{10}$, $b_{20}$,—are newly added so that the pulses $b_1$, $b_2$,—appear therebetween respectively as seen in FIG. 3.

It will be understood from the foregoing detailed description that, in the method of fuel injection timing detection according to the present invention, the time difference $t_1$ between the pulses $a_1$ and $b_1$ and the reference time difference $t_3$ between the pulse $b_1$ and a reference pulse appearing close to the pulse $a_1$ or $b_1$ are measured. In other words, these two time differences are measured at the mean angular velocities which are very close to each other. Consequently, the relative rotation phase angle $P\theta$ calculated according to the equation (2) is very accurate. Therefore, when the control of the timing of fuel injection according to the method of the present invention is applied to, for example, a diesel engine, the diesel engine can operate with better performance, and the present invention contributes greatly to improvements in the fuel consumption of the diesel engine and pollution of air by engine exhaust gases.

We claim:

1. A method of detecting the timing of fuel injection in an engine comprising the steps of:

mounting a first rotary member in a drive system of an output shaft of a fuel injection timing regulator, providing at least one first rotation angle indicating means on the circumference of said first rotary member in the direction of rotation of the same to indicate the timing of fuel injection by a fuel injection pump, mounting a second rotary member in a drive system of an input shaft of said fuel injection timing regulator, said input shaft being linked with the crankshaft of the engine, and said fuel injection timing regulator varying a phase angle between said input and output shafts in accordance with engine parameters, providing at least one second rotation angle indicating means on the circumference of said second rotary member in the direction of rotation of the same to indicate the phase angle of said second rotary member relative to said first rotary member having said first rotation angle indicating means provided thereon, providing at least one reference rotation angle indicating means on the circumference of said second rotary member at a position ahead of said second rotation angle indicating means in the direction of rotation of said second rotary member, disposing first and second sensing means opposite to said first and second rotary members respectively for sensing said reference rotation angle indicating means, said first rotation angle indicating means and said second rotation angle indicating means passing the positions opposite thereto, measuring the reference time difference between the pass time of said reference rotation angle indicating means and that of said second rotation angle indicating means passing the position opposite to said second sensing means, measuring the time difference between the pass time of said first rotation angle indicating means and that of said second rotation angle indicating means passing the positions opposite to said first and second sensing means respectively, the pass time of said first rotation angle indicating means being adapted to occur between the pass time of said reference rotation angle indicating means and that of said second rotation angle indicating means, so that the order of occurrences of the pass times is always unchanged to identify each of said rotation angle indicating means on the basis of which said time differences are measured, and calculating the phase angle of one of said shafts relative to the other on the basis of said measured former and latter time differences.

2. A method of fuel injection timing detection as claimed in claim 1, wherein said first rotary member and said second rotary member are discs respectively.

3. A method of fuel injection timing detection as claimed in claim 2, wherein said reference rotation angle indicating means, said first rotation angle indicating means and said second rotation angle indicating means are lugs provided on the circumference of said discs respectively in the direction of rotation of the same, and said first and second sensing means are a first electromagnetic pickup and a second electromagnetic pickup disposed opposite to the circumference of said discs respectively.

4. A method of fuel injection timing detection as claimed in claim 1, 2 or 3, wherein said second rotation angle indicating means is provided on the circumference of said second rotary member at a position corresponding to the upper dead point of the piston in each of the cylinders of the engine connected to said drive system driving said input shaft.

5. Apparatus for detecting the timing of fuel injection in an engine, comprising:

a first rotary member in a drive system of an output shaft of a fuel injection timing regulator, at least one first rotation angle indicating means disposed on the circumference of said first rotary member to indicate the timing of fuel injection by a fuel injection pump, a second rotary member in a drive system of an input shaft of said fuel injection timing regulator, said input shaft being linked with the crank shaft of the engine, said fuel injection timing regulator varying a phase angle between said input and output shafts in accordance with engine parameters, at least one second rotation angle indicating means disposed on the circumference of said second rotary member to indicate the phase angle of said second rotary member relative to said first rotary member, at least one reference rotation angle indicating means disposed on the circumference of said second rotary member, said reference rotation angle indicating means being positioned ahead of said second rotation angle indicating means in the direction of rotation of said second rotary member, first and second sensing means positioned adjacent to said first and second rotary members respectively for sensing said reference rotation angle indicating means and said first and second rotation angle indicating means as said angle indicating means pass by said sensing means, means for measuring the reference time difference between the times that said reference rotation angle indicating means and said second rotation angle indicating means pass by said second sensing means, means for measuring the time difference between the times that said first rotation angle indicating means and said second rotation angle indicating means pass by said first and second sensing means respectively, said first rotation angle indicating means being constructed and arranged to pass by said first sensing means between the times that said reference rotation angle indicating means and said second rotation angle indicating means pass by said second sensing means, so that the order of sensing said reference rotation angle indicating means, said first rotation angle indicating means and said second rotation angle indicating means is always unchanged in that order on the basis of which the time differences are measured, and means for calculating the phase angle of one of said shafts relative to the other of said shafts on the basis of said measured former and latter time differences.

6. Apparatus for detecting the timing of fuel injection in an engine as claimed in claim 5, wherein said first rotary member and said second rotary member comprise respective discs.

7. Apparatus for detecting the timing of fuel injection in an engine as claimed in claim 6, wherein said reference rotation angle indicating means, said first rotation angle indicating means and said second rotation angle indicating means comprise lugs provided on the circumferences of said respective discs, and wherein said first and second sensing means comprise a first electromagnetic pick up and a second electromagnetic pick up disposed adjacent to the circumferences of said respective discs.

8. Apparatus for detecting the timing of fuel injection in an engine as claimed in claim 7, wherein said second rotation angle indicating means is provided on the circumference of said second rotary member at a position corresponding to the upper dead point of the piston in each of the cylinders of the engine connected to said drive system driving said input shaft.

* * * * *